United States Patent
Lhymn et al.

(10) Patent No.: US 9,371,913 B2
(45) Date of Patent: Jun. 21, 2016

(54) VALVE APPARATUS FOR HIGH PRESSURE GAS CONTAINERS

(71) Applicants: Sue H. Lhymn, Erie, PA (US); Chris Lhymn, Erie, PA (US)

(72) Inventors: Sue H. Lhymn, Erie, PA (US); Chris Lhymn, Erie, PA (US)

(*) Notice: Subject to any disclaimer, the term of this patent is extended or adjusted under 35 U.S.C. 154(b) by 101 days.

(21) Appl. No.: 13/694,653

(22) Filed: Dec. 26, 2012

(65) Prior Publication Data
US 2014/0174574 A1 Jun. 26, 2014

(51) Int. Cl.
| | |
|---|---|
| F16K 21/00 | (2006.01) |
| F16K 1/30 | (2006.01) |
| F16K 31/42 | (2006.01) |
| F16K 1/36 | (2006.01) |
| F16K 17/38 | (2006.01) |
| F16K 25/00 | (2006.01) |

(52) U.S. Cl.
CPC . *F16K 1/30* (2013.01); *F16K 1/304* (2013.01); *F16K 1/36* (2013.01); *F16K 17/383* (2013.01); *F16K 25/005* (2013.01); *F16K 31/42* (2013.01); *Y10T 137/86292* (2015.04)

(58) Field of Classification Search
CPC ....... F16K 25/00; F16K 25/005; F16K 31/42; F16K 1/36; F16K 1/304; F16K 1/30
USPC ........ 137/72, 487.5, 490, 583, 594, 613, 614, 137/212; 251/129.15, 368
See application file for complete search history.

(56) References Cited

U.S. PATENT DOCUMENTS

| | | | | |
|---|---|---|---|---|
| 2,449,119 A * | 9/1948 | Holicer | | 222/3 |
| 2,642,261 A * | 6/1953 | Gates | | 251/322 |
| 3,835,884 A * | 9/1974 | Ishikawa et al. | | 137/550 |
| 4,926,898 A * | 5/1990 | Sampey | | 137/315.02 |
| 5,452,738 A * | 9/1995 | Borland et al. | | 137/265 |
| 5,511,576 A * | 4/1996 | Borland | | 137/72 |
| 6,766,829 B2 * | 7/2004 | Takeda et al. | | 137/877 |
| 7,013,916 B1 * | 3/2006 | Pearlstein et al. | | 137/613 |
| 8,550,105 B2 * | 10/2013 | Ishitoya et al. | | 137/72 |
| 8,783,284 B2 * | 7/2014 | Kato et al. | | 137/487 |
| 2002/0040729 A1 * | 4/2002 | Takeda et al. | | 137/74 |
| 2002/0074728 A1 * | 6/2002 | Kraus | | 277/353 |
| 2003/0102051 A1 * | 6/2003 | Hasaka et al. | | 141/325 |
| 2004/0154668 A1 * | 8/2004 | Larsen et al. | | 137/505.25 |
| 2005/0103382 A1 * | 5/2005 | Carter | | 137/487.5 |
| 2005/0252548 A1 * | 11/2005 | Stetson et al. | | 137/72 |
| 2005/0274422 A1 * | 12/2005 | Downie | | 137/613 |
| 2006/0137748 A1 * | 6/2006 | Cannet et al. | | 137/613 |
| 2006/0272715 A1 * | 12/2006 | Larsen et al. | | 137/613 |
| 2007/0138211 A1 * | 6/2007 | O'Leary et al. | | 222/368 |
| 2010/0258208 A1 * | 10/2010 | Bourasseau et al. | | 137/613 |
| 2010/0276012 A1 * | 11/2010 | Watanabe et al. | | 137/487.5 |
| 2011/0309076 A1 * | 12/2011 | Liebenberg et al. | | 220/203.01 |
| 2012/0132298 A1 * | 5/2012 | Ishitoya et al. | | 137/511 |
| 2012/0273059 A1 * | 11/2012 | Numazaki et al. | | 137/67 |
| 2013/0186487 A1 * | 7/2013 | Nomichi et al. | | 137/487 |

* cited by examiner

*Primary Examiner* — Eric Keasel
*Assistant Examiner* — Minh Le

(57) ABSTRACT

A valve apparatus is comprised of a solenoid valve, a manual valve, a pressure relief device, a check valve, an excess flow shut-off device, and a temperature sensor. The temperature sensor is arranged inside the tank in an ambient atmosphere. The sealing member is prevented from falling off from the recess by a floating seal structure. The sealing effectiveness is improved by employing a double seal configuration and also by a smooth surface roughness. A high pressure seal structure is presented. The improved pressure relief device design for 75 MPa application has been presented.

4 Claims, 13 Drawing Sheets

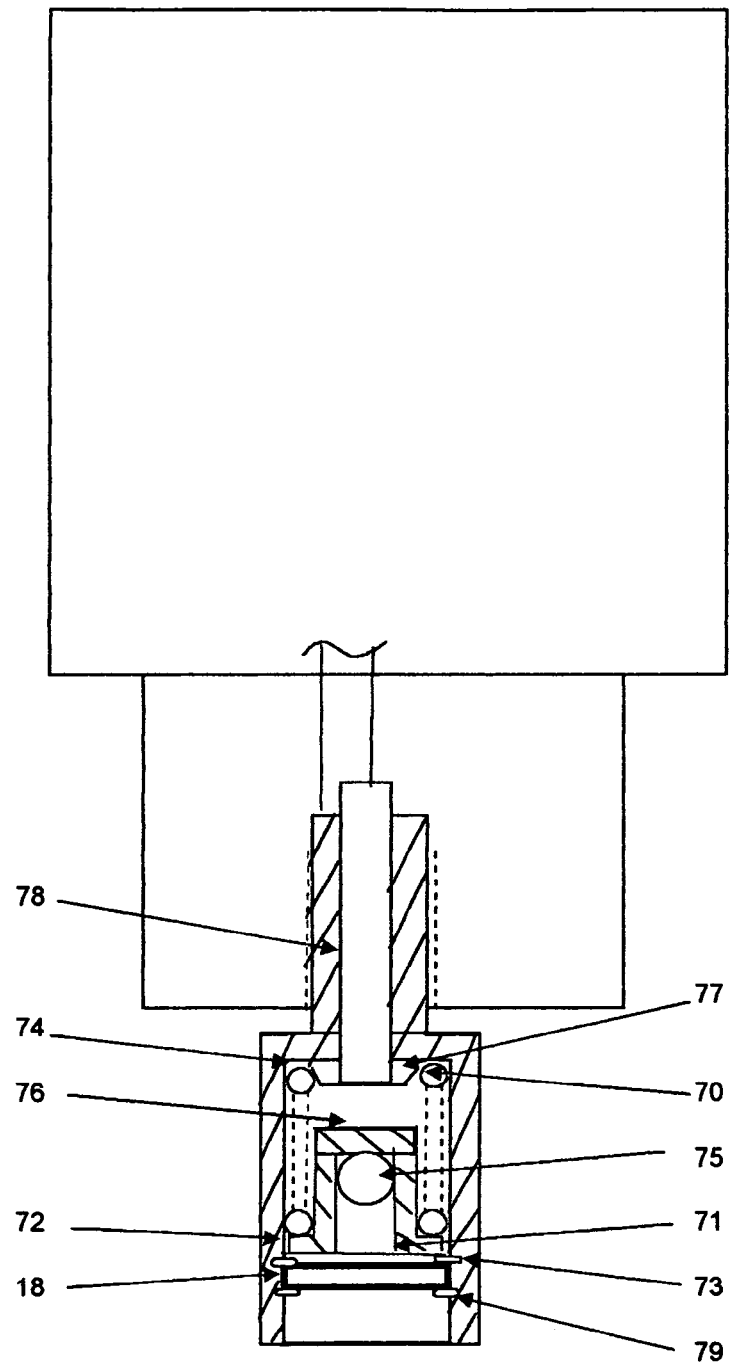
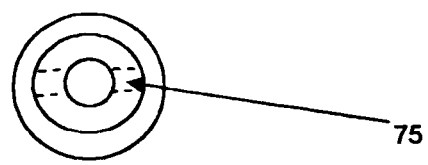

VALVE APPARATUS FOR HIGH PRESSURE GAS CONTAINERS

BACKGROUND OF THE INVENTION

The present invention relates to a high pressure valve for hydrogen gas, natural gas, or other gases. Specifically the present invention pertains to a solenoid valve and a manual valve used at a high pressure. Particularly the solenoid valve is suitable for use in a high pressure hydrogen gas tank for vehicles driven by a fuel cell. For a hydrogen tank used for a fuel cell-driven vehicle, it is often pressurized up to 700 Bar (10,000 psi) and leakage-free solenoid valve is difficult to fabricate and currently is not available commercially. Thus there is a need to improve the sealing design for gastight valve.

In prior art, the disc shape seal is inserted into the recess created in the stem or sealing assembly. Often such disc falls off from the recess to lose the gas tightness at the orifice opening. This invention attempts to eliminate such separation of sealing member from the seal-holding recess in the sealing assembly. Such objective is another aim of the present invention.

Still another objective of the present invention is to develop a leak-free seal material endurable at 700 bar pressure.

SUMMARY

The invention presents a valve apparatus that prevents a seal member from falling off from a movable plunger when sealing is performed via the seal member fitted in the movable plunger and also presents a high pressure seal structure.

According to a first aspect and feature of the present invention, the present invention provides a high pressure valve device comprising of
  a) a valve housing that accommodates a manual valve, a solenoid valve, a pressure relief device (PRD), a check valve, an excess flow shut-off device (EFS), and filters;
  b) two communication holes, the first communication hole providing fluid communication between the high pressure source inside a cylinder and the outer atmosphere through the PRD, said communication hole passage also providing the fluid communication between the high pressure source and the gas filling port via a check valve;
  c) the second communication hole passage providing fluid communication between the high pressure source inside a cylinder and the gas supply port via a manual valve and a solenoid valve;
  d) a first seal member arranged in a manual valve that provides or shuts off fluid communication between the high pressure source and a solenoid valve in such a manner that the first seal member moves away or contacts the valve seat;
  e) a second seal member that provides fluid communication between a solenoid valve and the output port.

According to a second aspect and feature of the present invention, the invention provides a solenoid valve comprising the operating unit and the moving unit: the moving unit consists of, a movable core plunger, a pilot plunger, a main valve body and a pilot valve body; the operating unit consists of a solenoid and restoring coil. The main valve body contacts the main valve seat in closed state, and in an open state, the main valve body is separated from the main valve seat. The pilot valve is switchable between an open state where the pilot valve body is separated from the pilot valve seat and a closed state where the pilot valve body contacts the pilot valve seat. The main valve body is switched from the closed state to the open state when the pilot valve body is switched from the closed state to the open state.

According to a third aspect and feature of the present invention, the pilot valve body consists of a pilot core slidable inside a bore and a pilot seal. The pilot seal is disposed inside a bore of movable core plunger at the end of bore, and the pilot seal is always subject to compressive force of the spring via a pilot core when the coil is de-energized.

According to a fourth aspect and feature of the present invention, the main valve seal member of the solenoid valve is of a tapered cone geometry with two or more O-ring grooves on it and the main valve seat is tapered to match the tapered seal member, the distal end of the main seal member having a pilot seat with a small orifice, said small orifice facing the pilot seal through an opening at the end of a movable core plunger.

With the above aspect of the invention, the pilot seal member is trapped inside a hollow cavity, pressed by a slidable pilot plunger on the one side and abutting against the shoulder step on the other side such that the pilot seal cannot fall off from the movable core while performing the sealing function by being in contact with the pilot seat when the coil is de-energized.

According to a fifth aspect and feature of the present invention, a coupler joining the movable core with the main seal member is provided as well as a coupling pin piercing through a hole of movable core, through a hole of the coupler, and also through a hole of the pilot core.

With the above aspect, the pilot seal is separated from the pilot seat when the coil is energized and the pilot orifice opens up for gas passage since the pilot core material is magnetic. The movable core plunger is also a magnetic material. Thus, the pilot orifice becomes a gas passage channel to equalize the pressure in the main orifice with the pressure in the pilot orifice in order to open the main orifice for gas passage.

According to a sixth aspect and feature of the present invention, the tapered cone seal member has O-ring grooves for installing O-rings in double or multiple configurations. The mating valve body seat is also of tapered cone shape, and thus the airtight sealing is achieved.

According to a seventh aspect and feature of the present invention, a temperature sensor is installed in a sensor chamber inside a tank. As such the temperature sensor is held in an ambient environment by means of a sealed chamber. The chamber is open to the outside atmosphere through a sealed passage and an accurate reading of temperature inside the tank is possible.

According to an eighth aspect and feature of the present invention, a pressure relief device is presented as a thermal safety device as demonstrated in prior arts [U.S. Pat. Nos. 4,962,003; 5,223,347; 5,419,357; 4,927,712]. When a gas pressure rises to 700 bar, the cavity length (L) over cavity diameter (D) ratio must be greater than a minimum to have a creep strength at elevated temperatures. Said minimum is three or greater. Further, in order to shorten the heat response time in fire, the outer surface of PRD shell is given a rough feature such as threads or grooves. Still further, the fusible alloy filling the straight cavity is contained in the central middle zone only, because both end zones are covered by a bulky mass like a valve body or a venting pipe fitting.

According to a ninth aspect and feature of the present invention, filter discs of simple design and compact geometry are provided in the valve. The first filter (outlet filter) is inside the gas supply port and the second filter (inlet filter) is disposed between the manual valve and the excess flow shut-off device. The third filter in arranged inside the check valve (check valve filter). Because of a compact size and simple geometry, the disc filters can be arranged in a small valve assembly at inlet, outlet, and fill port. The critical sealing members of solenoid and manual valves are thus protected from dust particles or contaminants by neighboring inlet and outlet filters.

According to a tenth aspect and feature of the present invention, the valve architecture of multiple tanks is presented. The valve assembly for the first tank contains a solenoid valve, while the valve assembly for the second tank (also the third tank and on) contains no solenoid valve while other components being same as the first valve.

According to an eleventh aspect and feature of the present invention, a manual valve airtight at 700 bar is presented with a sealing structure comprising: a washer-like first seal member followed by an O-ring or two O-ring configuration. In case of a two O-ring installation, the first O-ring has a back-up ring.

According to a twelfth aspect and feature of the present invention, a reliable seal material and seal structure are presented. A single layer, a double layer, and a multi-layer structure are proposed for use at 10,000 psi gas pressure. They basically deform slightly for sealing but do not deform destructively.

BRIEF DESCRIPTION OF THE DRAWINGS

FIG. 1 (B) is a valve assembly architecture when multiple tanks are employed.
FIG. 4 (B) is a tube holder for solenoid parts.
FIG. 6 is a sketch of excess flow shut-off device.

DETAILED DESCRIPTION OF THE PREFERRED EMBODIMENTS

The explanation of the present invention is given according to FIGS. 1 to 11 in the following section.

Figure 1A:
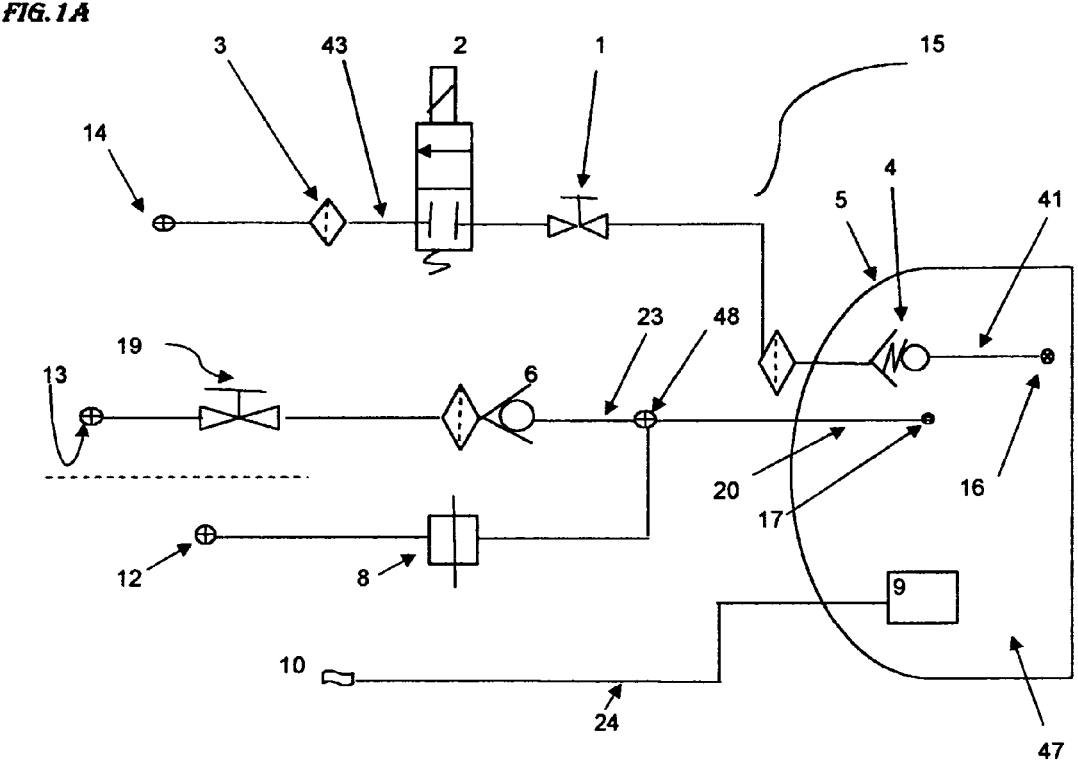
FIG. 1 (A) is an architecture valve apparatus.

First, the architecture of the valve assembly is explained by reference to FIG. 1(A). The valve apparatus 15 consists of a fuel supply passage 14, a gas filling passage 13, a gas discharge PRD line 12 in case of fire, and a temperature sensor port 10. The gas charging passage 13 and discharge passage 12 are joined upstream and communicate with the gas cylinder 5 at communication passage 17.

The fuel supply passage 14 starts from the input 16, and then through an excess flow shut-off device 4, an inlet filter 18, a manual open/close valve 1, an electromagnetic solenoid on/off valve 2, an outlet filter 3, and finally outlet gas supply port 14.

The fuel shut-off valve consists of a manual valve 1 and a solenoid valve 2. The gas charging passage 13 is composed of a check valve 6 and an open/close manual valve 19. The manual valve 19 is arranged outside of the valve apparatus in the gas filling line.

The gas discharge port 12 is an outlet of PRD when the PRD is activated in case of fire or exposure to an abnormally high temperature. The PRD line and gas filling passage line share the common upstream line 20 and communicate with the cylinder fuel gas at port 17. The temperature sensor port 10 is actually two loose electric wires coming from the sensor located inside the sensor chamber 9.

Figure 2:
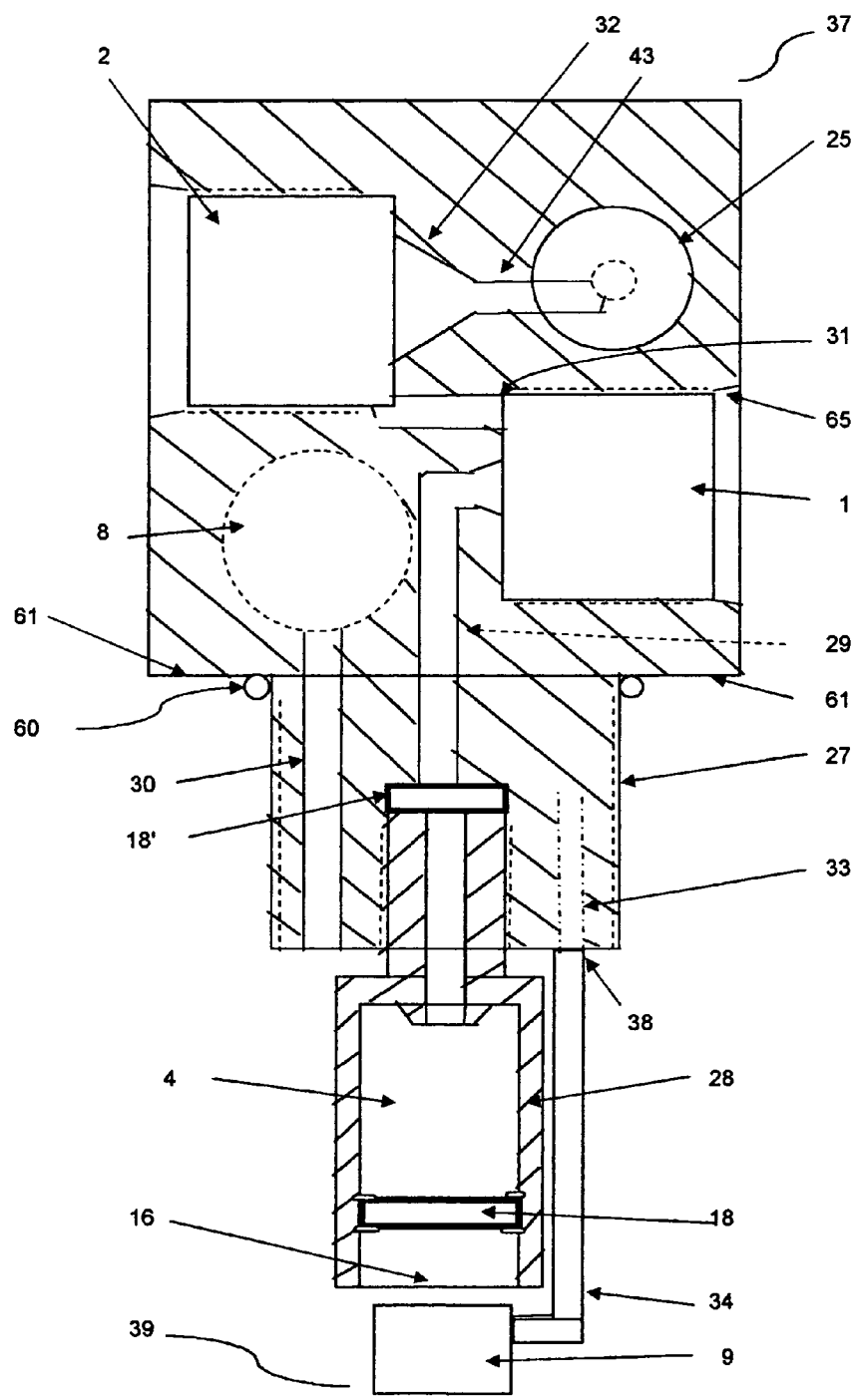
FIG. 2 is a front view of valve apparatus.

As shown in FIG. 2, three independent passage channels are seen. The gas charging/discharge passage line 30, gas supply passage line 29, and the temperature sensor feedthrough line 33 are communicating with the interior space of gas cylinder. The temperature sensor can be installed on a valve body (external) when the space at the tank mouthpiece is limited.

Figure 1B:
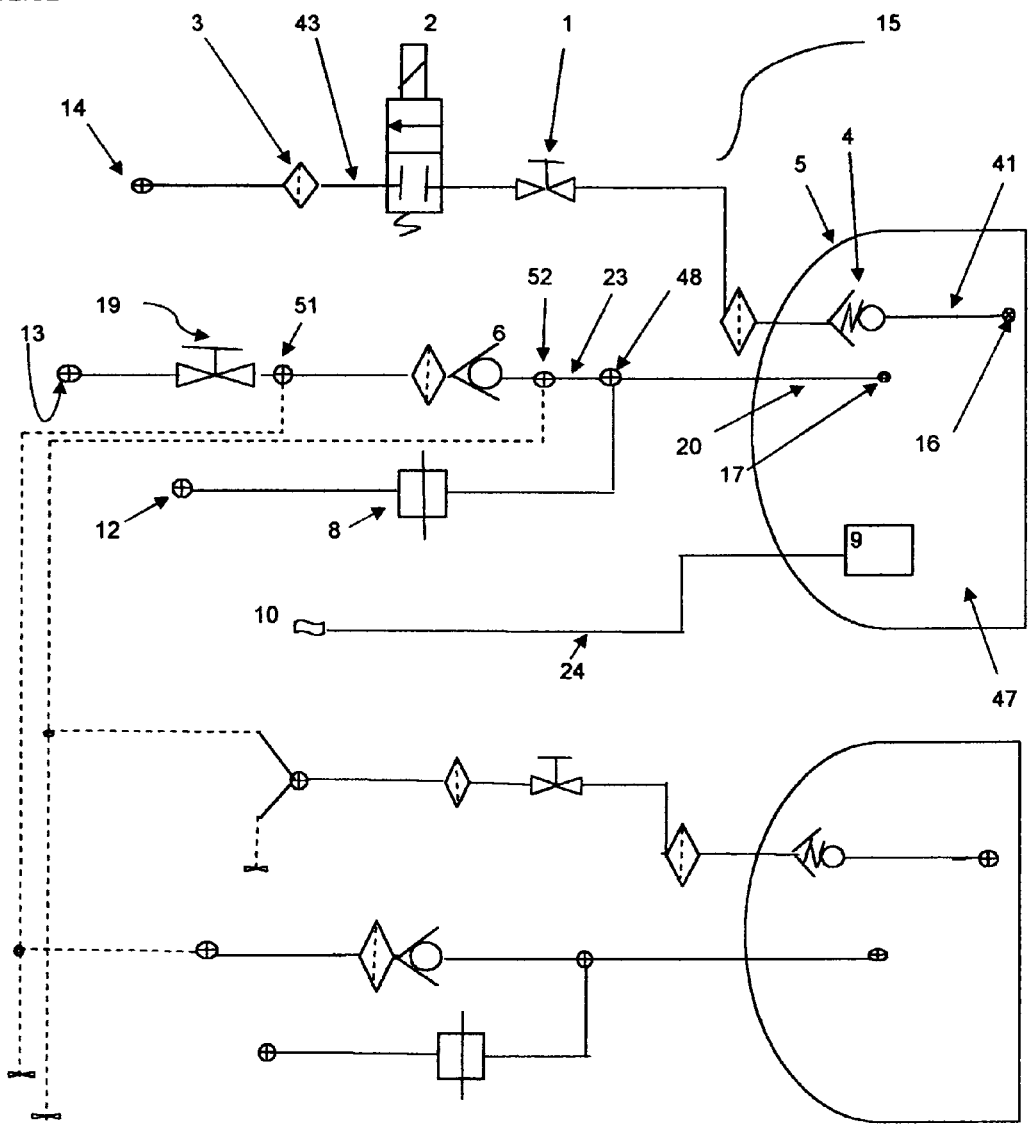
Figure 7:
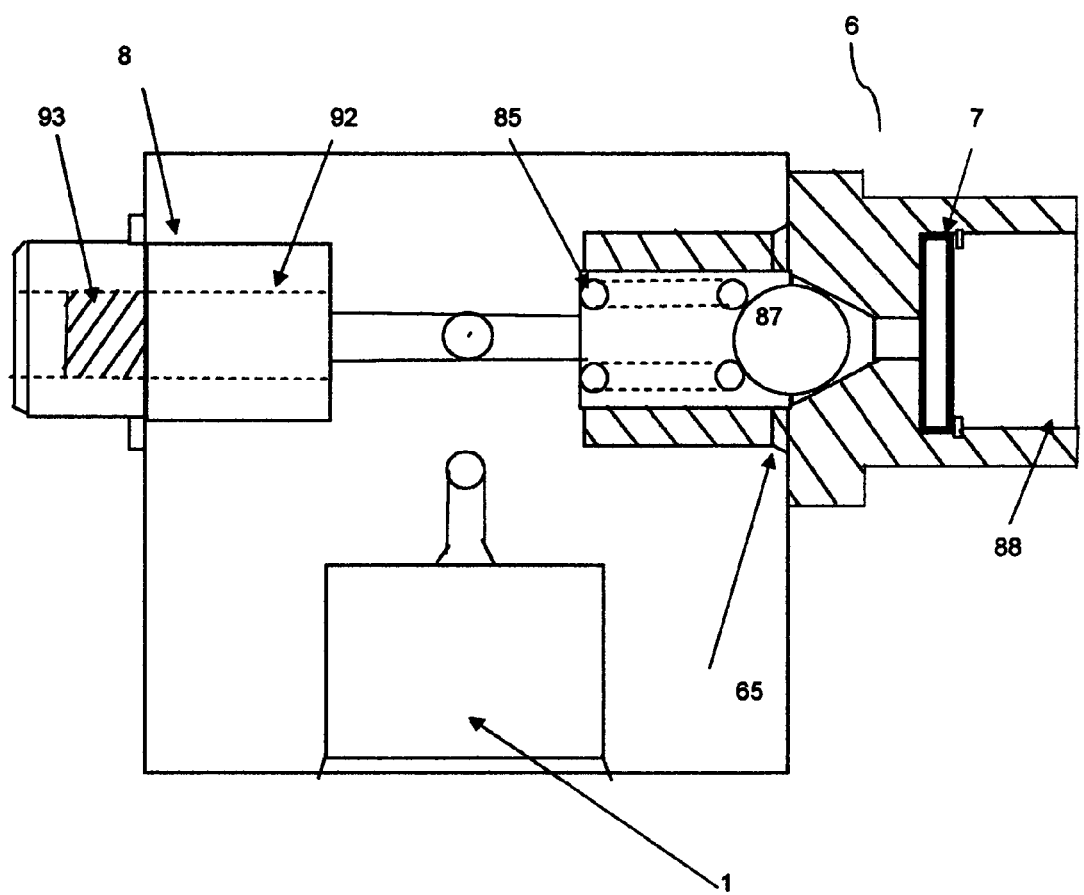
FIG. 7 is detailed view of check valve.
Figure 8:
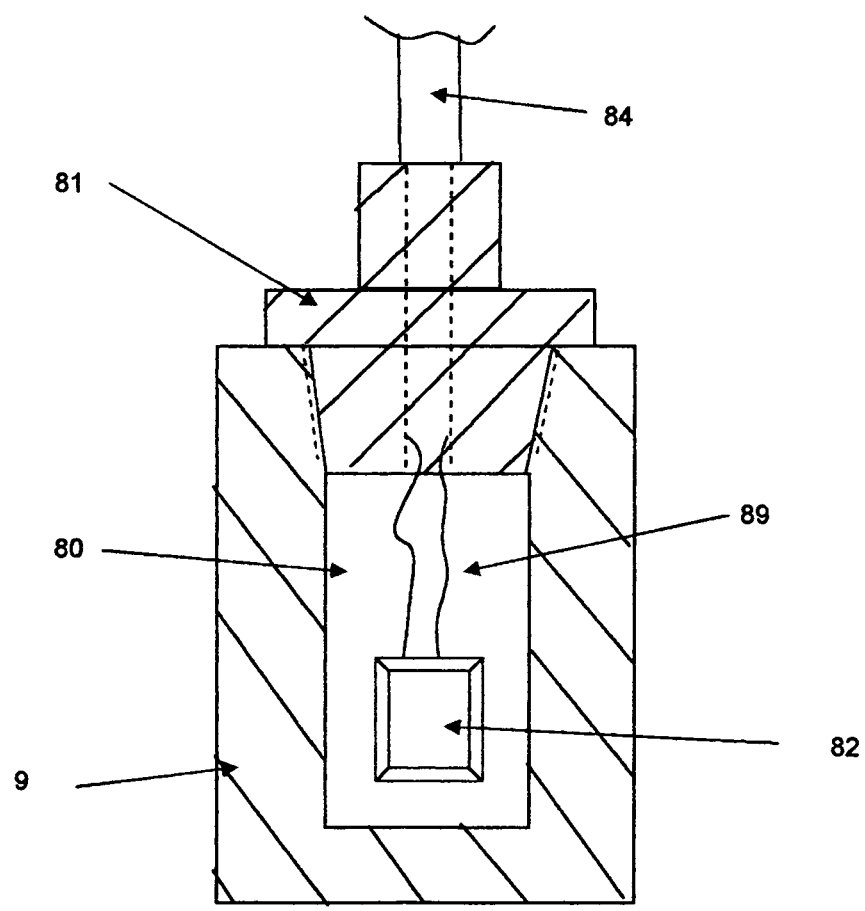
FIG. 8 is a sketch of thermal sensor chamber.
Figure 9:
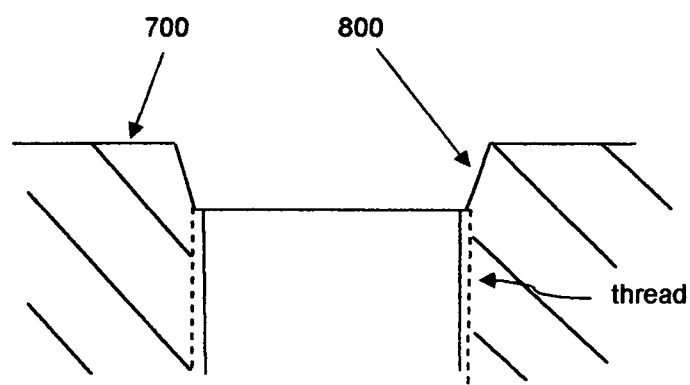
FIG. 9 is an example of sealing surface using an O-ring.
Figure 10:
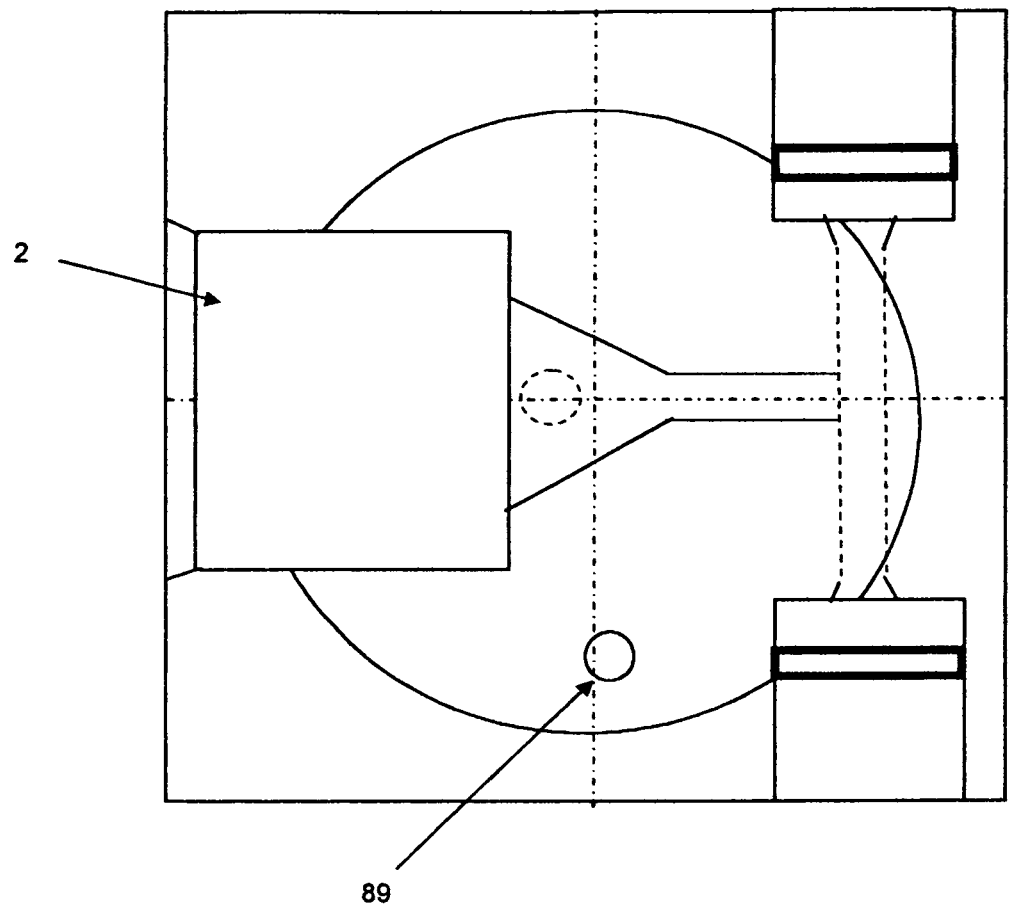
FIG. 10 shows outlet ports incorporating disc filters.

The gas supply outlet filters 3 of FIG. 1 and FIG. 10 is of disc geometry and are arranged at outlet location by a shoulder on the inner side and a snap ring-like clip device on the outer side as shown in FIG. 10. The filter 7 in the gas filling line is located inside a check valve 6 as shown in FIG. 7.

The gas filling path is not connected to the gas supply path; both are mutually independent. Each path has its own filter, and thus the filling passage and the gas supply passage have its own separate filter rather than sharing a single filter for both filling and supply passage lines.

Because of the small size of disc geometry of thin thickness, the installation of three filters in a small valve assembly is possible, as a part of check valve and as an insert before the manual valve and after the solenoid valve, such that the sealing members of manual and solenoid valves are protected from dust particles and contaminants. The gas passage channel 31 of FIG. 2 allows the gas to flow from the manual valve 1 to the solenoid valve 2.

When the solenoid valve is open by coil energization, the fuel gas in the solenoid valve chamber is guided to the outlet 25.

The sensor chamber 80 is atmospheric and the sensor itself 82 is contained inside the sensor chamber 80. The sensor has two loose wires which are guided through the tube 84, cavity channel 33, and exits the valve assembly at location 33 of FIG. 10. The sensor itself is very thin and about 5 mm×5 mm in size.

The excess flow shut-off device (EFS) 4 is shown in detail in FIG. 6. The EFS body has a shoulder 72 and overall geometry is of a cup shape. The spring 70 supports EFS body 71 against a snap ring 73. The EFS body 71 has two through holes 75 right-angled to each other for gas flow passage channel. In the event of an extreme flow of gas by accident or the like, the EFS body 71 is pulled in by a suction force so that the bottom surface 76 of EFS body touches/seals the raised lip plateau 77 to stop the drastic gas flow. The gas flow through the flow passage 78 is thus stopped.

The PRD port 94 can be of variety of thread size. The PRD shell has a straight cavity 92 with the fusible alloy filling the cavity in the central portion 93, and the length/diameter ratio of alloy-filled central zone 93 is greater than about 3 to have sufficient creep strength. The straight cavity of PRD is filled with a fusible alloy filled with reinforcing agents [U.S. Pat. No. 5,419,357].

In order to reduce the heat/fire response time of PRD, the fusible alloy is desired to be filled in the central zone of cavity, i.e., the alloy slug at both ends of cavity is not surrounded by a heavy fitting wall or valve body. In addition to such central filling of alloy, the metal shell of PRD is desired to have grooves/threads to increase the heat-absorbing surface area.

Figure 3:
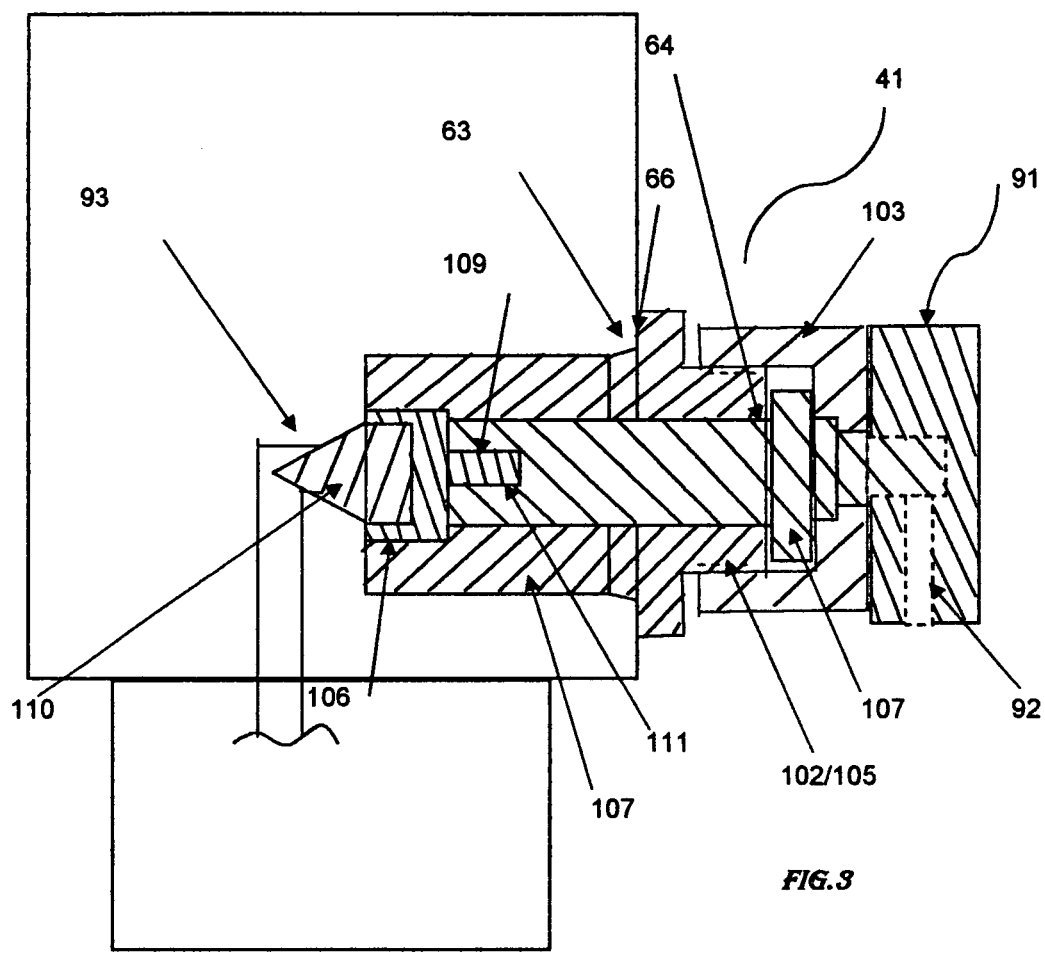
FIG. 3 is a detailed view of manual valve section.
Figure 11:
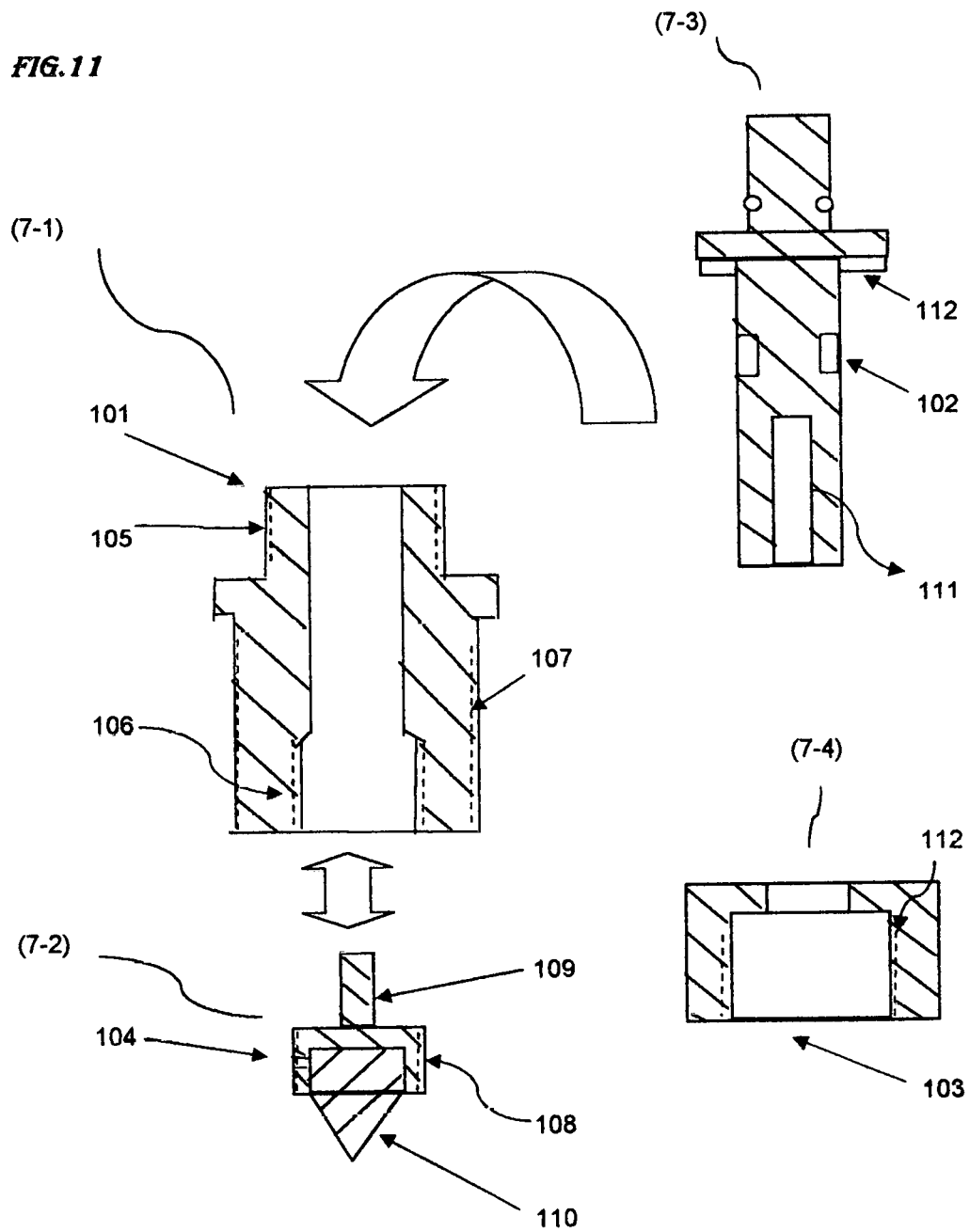
FIG. 11 shows the breakdown of manual valve parts.

The manual valve 1 consists of five parts shown in FIG. 11: a male connector-like stem holder 7-1, a lower stem 7-2, an upper stem 7-3, and a cap 7-4. In addition, a handle bar 91 of FIG. 3 is needed to open/close the orifice seal 93 of FIG. 3. The upper stem has an O-ring groove 102 for sealing and the lower stem has a seal 110 for closing the orifice 93 of FIG. 3.

Alternatively the upper stem 107 contains a flat washer seal 112 and an O-ring groove in the upper or lower part, producing a double sealing effect. The material of seal 110 could be PEEK, Vespel, polyimides. teflon-based composites, PPS, or other engineering plastics. The number of O-rings in the upper stem is two or more for sealing effectiveness at 700 bar.

Figure 4A:
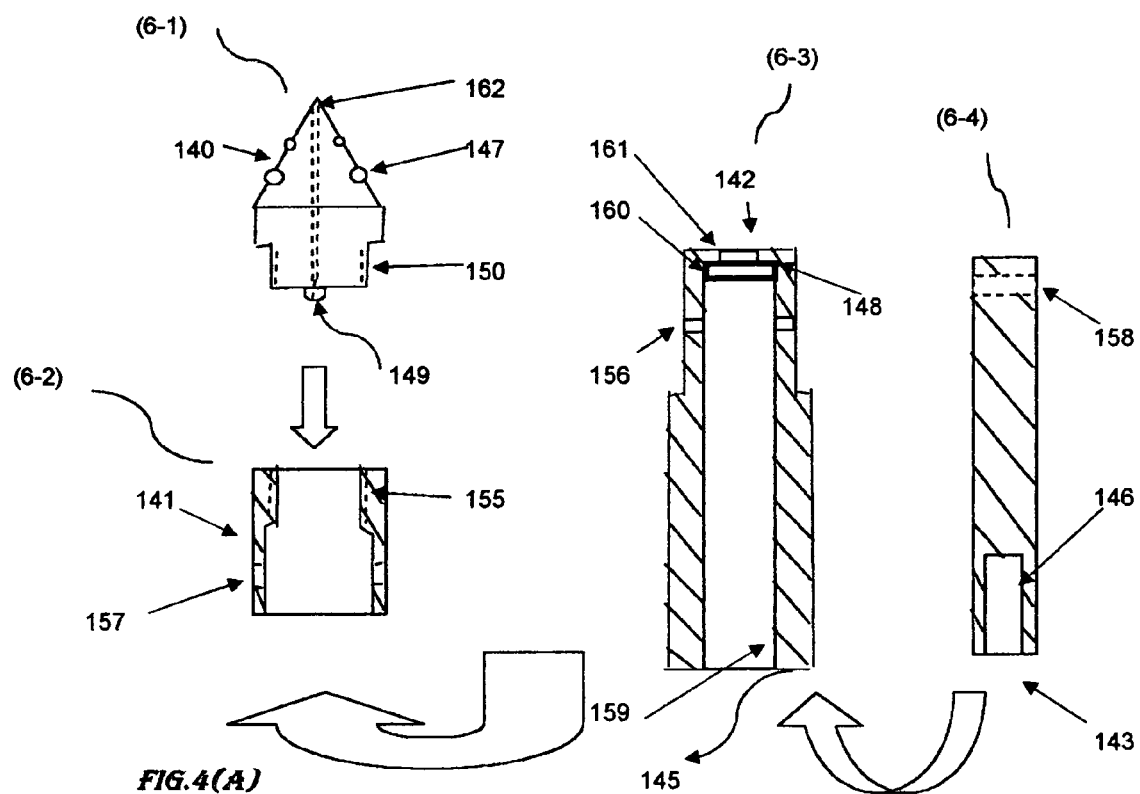
FIG. 4 (A) is a view of solenoid valve parts.
Figure 4B:
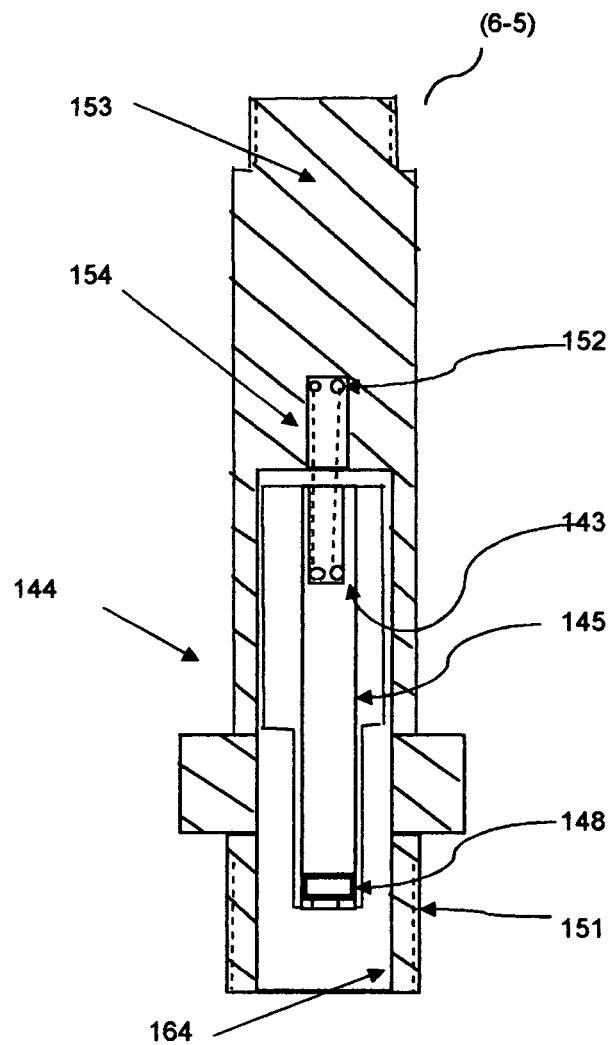

The solenoid valve 2 comprises as shown in FIG. 4(A) and FIG. 4(B): a tube housing 6-5 having a hollow cavity 164 formed in the longitudinal direction thereof with a fixed core 153 at the end of hollow cavity; a movable assembly 6-1, 6-2, 6-3, & 6-4 disposed in the hollow part mostly; and an operating unit that moves the movable unit forward and backward, operating unit being comprised of coil 90 and spring 152. The movable unit consists of a main valve assembly 6-1 & 6-2, movable core plunger 6-3, pilot valve assembly 6-4, and a pilot plunger 143.

The coupler 6-2 is operatively connected to the movable core 6-3 by means of a coupling pin through pin holes 156, 157, and 158. The distal end of a coupler is screwed to the male thread 150 of the main valve seat body 6-1. The fixed core is integrally formed in the tube housing, and the movable plunger is opposed to the fixed (stationary) core.

The proximal end of the main valve seat body 6-1 has a pilot seat 149 of semi-circular geometry with a small pilot orifice 163 at the center. The distal end of the main seat body 6-1 is of tapered seat shape 140 with O-ring grooves 147 on its surface. There are at least 2 O-ring grooves for sealing.

The pilot plunger 143 is slidable inside the bore 159 formed in the movable core plunger 6-3. At the end of the pilot core 143, a pilot seal 146 is in contact with the pilot seat 149 when the solenoid is de-energized. The whole line-up of cone seat 140/pilot seat 149/through orifice 161/pilot seal 148 is under a compressive load generated by a coil spring 152 disposed between the cavity formed at the distal end of the pilot plunger 143 and the cavity 154 formed in the fixed core 151.

In a way, the slidable pilot seal 148 has the floating structure to seal the pilot seat 149. As such, excessive stress is not generated in the pilot seal so that a destructive deformation can be avoided in the pilot seal 148. In addition, the O-rings 147 efficiently seal the seat surface of tapered geometry, the sealing force being reinforced by a specific geometry. The fixed core tube housing 4-5 seals the valve assembly against the outer environment and helps the magnetic flux to lift the plunger when the coil is energized.

The pilot seal material is a polyimide or similar strong and flexible material, and thus in a closed state it deforms almost elastically. Such materials are, for example, any polymeric composites reinforced with fibers, particles, woven fabrics, fiber mats, or any other reinforcing agents. Reinforced elastomer composites are another example. An additional example is a two layer composite structure consisting of a soft, flexible first layer and a second strong layer which resists a destructive plastic deformation, such as strong polyimides coated with a soft polymer layer or rubber-based material layer. Said two-layer composite can be extended to a three-layer (soft-strong-soft) or four-layer (soft-strong-soft-strong) structure having a sealing capability without destructive deformation, depending on the resilient spring force and gas pressure inside the tank. Any single layer structure based on polymers or elastomers which seal without destructive plastic deformation can be used.

In addition, the surface roughness is less than or equal to 1.micro.m Ra and therefore the sealing effectiveness is achieved at 75 MPa pressure (10,000 psi). The O-ring 60 of FIG. 2 seals the valve/cylinder interface at high pressure of 700 bar for instance. The surface roughness of mating plane 61 is required to be at least 1.mu.m Ra or smoother in order to prevent a leak at 700 bar pressure, for example. The cylinder counterpart surface (FIG. 9) accommodating O-ring 60 must also be of surface roughness 1 .mu.m Ra or smoother. Depending on the O-ring thickness, the mating recess has a certain depth and the annular surface at the edge of recess has a slight slope less than about 30 degrees, preferably less than about 20 degrees. The RMS of recessed surface area and the mating surface of cylinder must be smoother than 1 .mu.m Ra to prevent a possible leak at high pressure.

Figure 5:
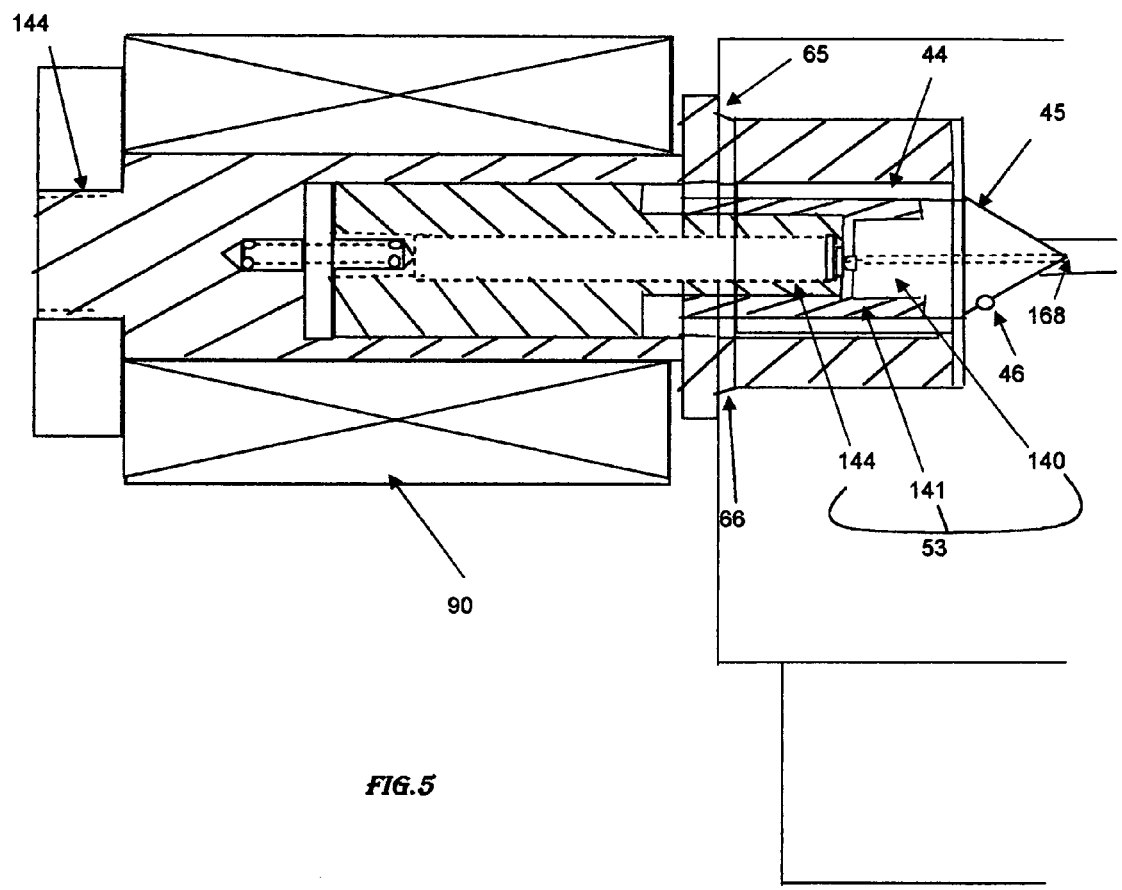
FIG. 5 is a detailed composite sketch of solenoid valve.

Said O-ring boss style sealing occurs also at surface 64 and surface 63 of FIG. 3, surface 66 of FIG. 3 and FIG. 5, surface 65 of FIG. 5 and surface 65 of FIG. 7. The surface roughness at sealing surfaces for two mating parts must also be 1.micro.mm Ra or better for leak-proof structure.

Now the operation of the solenoid valve section is briefly explained. When the solenoid coil is energized, the pilot plunger 143 is separated from the pilot seal 148 by the magnetic force created. Since the pilot seal 148 is slidable in the bore 159, the compressed gas flows through the pilot orifice 149, the pilot passage 162, in such a way that the pressure differential between the pilot orifice and the main orifice 43 begins to vanish, eventually reaching the stage in which the movable core plunger 142 is pulled toward the fixed core 153.

At this moment, the main valve seal member 147 is detached from the seat, allowing the gas to flow freely toward the outlet 25, i.e., the open state valve. When the coil is de-energized, the pilot plunger and movable core plunger are pressed against the mating seat by the resilient force of coil spring, i.e., the valve is in a closed state. The tapered seat geometry enhances the seatability, and thus a stable seating state is achieved. The dual sealing design also improves the stable seating state.

As should be appreciated by those skilled in the art, the embodiments described above are not meant to limit the scope of the present invention. They are meant to be exemplary of the many embodiments and variations that are encompassed herein and that are claimed below.

INDUSTRIAL AVAILABILITY

A solenoid valve apparatus, according to the present invention, installed in high pressure tank can be obtained, which is small in size and reliable in sealing effectiveness. The solenoid valve apparatus is available to a fuel cell vehicle driven by a hydrogen tank of high pressure.

What is claimed is:
1. A valve assembly comprising:
  a housing body being fixedly connected to a gas cylinder and provided with a gas inlet port which communicates with an interior of the gas cylinder;
  a gas supply passage communicating the gas inlet port with the interior of the gas cylinder;
  a gas charging passage arranged separately from the gas supply passage, and communicating a gas charging port with the interior of the gas cylinder;
  a pressure relief device passage in communicating with the gas charging passage;
  a check valve arranged in the gas charging passage downstream of the gas charging port, wherein the pressure relief device passage connected to the gas charging passage at a location upstream of the check valve;
  a temperature sensor passage arranged separately from the gas supply and gas charging passages to communicate the atmospheric environment with a sensor chamber positioned inside the gas cylinder;

a temperature sensor wire sealingly routes through the temperature passage and connects with a temperature sensor arranged inside the sensor chamber;

a first manual valve arranged in the gas supply passage;

a solenoid valve arranged in the gas supply passage and downstream of the first manual valve; an outlet of the solenoid valve communicating with a gas outlet port; said solenoid valve having:

a valve chamber, a valve seat of conical shape provided in a gas passage of the valve, a valve closing spring, an electromagnetic device, a tube housing, wherein one end of the tube housing is closed in the interior thereof, a movable assembly located in the tube housing and being pushed toward the valve seat by a resilient force of the valve closing spring and moved in a valve opening direction when the electromagnetic device is energized, the movable assembly consisting of:

a main valve member having O-rings on its conical surface and a pilot seat at opposite end of the conical surface, a coupler;

a movable core plunger, a slidable pilot plunger, and a pilot seal, wherein said pilot seal is trapped inside the movable core plunger and abuts on a shoulder at the end of cavity of the movable core plunger with other face of the pilot seal being in contact with the slidable pilot plunger, and wherein said pilot seal is in contact with the pilot seat through a small through hole at the end of the movable core plunger when the solenoid valve is in a closed state by de-energization of solenoid coil, the pilot seal being detached from the pilot seat when the coil is energized to open the main valve member contact, and further wherein the diameter of the small through hole is smaller than the diameter of pilot seal such that the pilot seal cannot fall off the movable core plunger cavity;

an excess flow shut off device arranged in the gas supply passage and upstream of the first manual valve;

a thermal safety device provided in the pressure relief device passage, comprising: a straight cavity, and a fusible alloy mixed with reinforced agents fills the central of the straight cavity; wherein the straight cavity is not covered by the housing body or a connection fitting hardware.

2. The valve assembly according to claim 1, wherein the surface roughness of sealing surfaces with the O-ring is smooth with the surface roughness in Ra being 1.m.u.m. or smoother.

3. The valve assembly according to claim 1, wherein the pilot seal material is selected from the group consisting of reinforced polymer composites, two layer composites consisting of a first soft layer facing the pilot seal and the second strong layer, polyimides coated with flexible/soft polymers, polyimides coated with elastomers, and any other single layer or multi-layer structure which deforms for sealing and which does not deform destructively.

4. The valve assembly according to claim 1, wherein the excess flow shut-off device includes a movable EFS a hollow core with one open end and one closed end, wherein there are four side openings on a round sidewall of the hollow core.

* * * * *